US012782224B2

(12) United States Patent
Townsend

(10) Patent No.: US 12,782,224 B2
(45) Date of Patent: Nov. 3, 2026

(54) LEAK DETECTION APPARATUS

(71) Applicant: Steven Townsend, Dubbo (AU)

(72) Inventor: Steven Townsend, Dubbo (AU)

( * ) Notice: Subject to any disclaimer, the term of this patent is extended or adjusted under 35 U.S.C. 154(b) by 0 days.

(21) Appl. No.: 18/552,592

(22) PCT Filed: Apr. 1, 2022

(86) PCT No.: PCT/AU2022/050294
§ 371 (c)(1),
(2) Date: Sep. 26, 2023

(87) PCT Pub. No.: WO2022/204763
PCT Pub. Date: Oct. 6, 2022

(65) Prior Publication Data

US 2024/0192076 A1 Jun. 13, 2024

(30) Foreign Application Priority Data

Apr. 2, 2021 (AU) ................................ 2021900986

(51) Int. Cl.
*G01M 3/16* (2006.01)

(52) U.S. Cl.
CPC .................................... *G01M 3/16* (2013.01)

(58) Field of Classification Search
CPC ........ G01M 3/16; G01M 3/04; G08B 21/182; G01R 27/02; G01R 19/165
See application file for complete search history.

(56) References Cited

U.S. PATENT DOCUMENTS

| | | | | |
|---|---|---|---|---|
| 6,639,517 | B1 | 10/2003 | Chapman et al. | |
| 8,416,089 | B1 * | 4/2013 | Clary | G01M 3/045 73/40 |
| 2004/0105758 | A1 * | 6/2004 | Ross | F04D 15/0218 417/63 |

(Continued)

FOREIGN PATENT DOCUMENTS

| | | | |
|---|---|---|---|
| CN | 205244847 | U | 5/2016 |
| CN | 109764247 | A | 5/2019 |

(Continued)

OTHER PUBLICATIONS

International Search Report & Written Opinion dated Jun. 30, 2022 from PCT Application No. PCT/AU2022/050294.

*Primary Examiner* — Ryan W Sherwin
(74) *Attorney, Agent, or Firm* — INNOVATION CAPITAL LAW GROUP, LLP; Vic Lin

(57) ABSTRACT

Leak detection apparatus has an installable detector comprising a plurality of spaced apart electrical electrodes. A controller operably interfaces the plurality of electrical electrodes. The controller is configured for detecting a leak by detecting current flow through water pooled between the electrodes. The detector is installable within wall and void spaces surrounding wet areas such as bathroom baths, showers, cabinetry, kitchen and bathroom basins and the like. As such, the detector is able to detect a leak when a waterproof membrane is compromised, or movement and/or poor workmanship allows water to flow therethrough. The detector may comprise a flexible body which may be elongate for installation in tight spaces and around corners and/or a mat for covering large areas such as under baths and which may be cut to size to fit.

33 Claims, 1 Drawing Sheet

(56) References Cited

U.S. PATENT DOCUMENTS

| | | | | |
|---|---|---|---|---|
| 2010/0100026 | A1* | 4/2010 | Morris | G01M 3/16<br>604/4.01 |
| 2011/0289796 | A1* | 12/2011 | Ha | D06F 58/24<br>34/73 |
| 2012/0247574 | A1* | 10/2012 | Vainshtein | A47B 97/00<br>137/312 |
| 2014/0253150 | A1* | 9/2014 | Menzel | G01R 27/2605<br>324/694 |
| 2014/0317954 | A1* | 10/2014 | McCallum | F26B 21/08<br>34/565 |
| 2015/0048952 | A1* | 2/2015 | Murphy | G08B 21/182<br>340/682 |
| 2015/0102932 | A1* | 4/2015 | Miller | G08B 21/20<br>340/605 |
| 2016/0166757 | A1* | 6/2016 | Koyama | G01M 3/16<br>324/693 |
| 2016/0260312 | A1* | 9/2016 | Hazzard | G08B 25/08 |
| 2017/0187541 | A1* | 6/2017 | Sundaresan | G01N 27/00 |
| 2017/0227415 | A1* | 8/2017 | Jang | G01N 17/02 |
| 2022/0074780 | A1* | 3/2022 | Aponte Luis | G08B 21/20 |

FOREIGN PATENT DOCUMENTS

| | | | |
|---|---|---|---|
| JP | 2004101282 | A | 4/2004 |
| JP | 2004170333 | A | 6/2004 |
| JP | 2010014481 | A | 1/2010 |
| JP | 2018205165 | A | 12/2018 |
| JP | 2020085552 | A | 6/2020 |
| KR | 102110849 | B1 | 5/2020 |

* cited by examiner

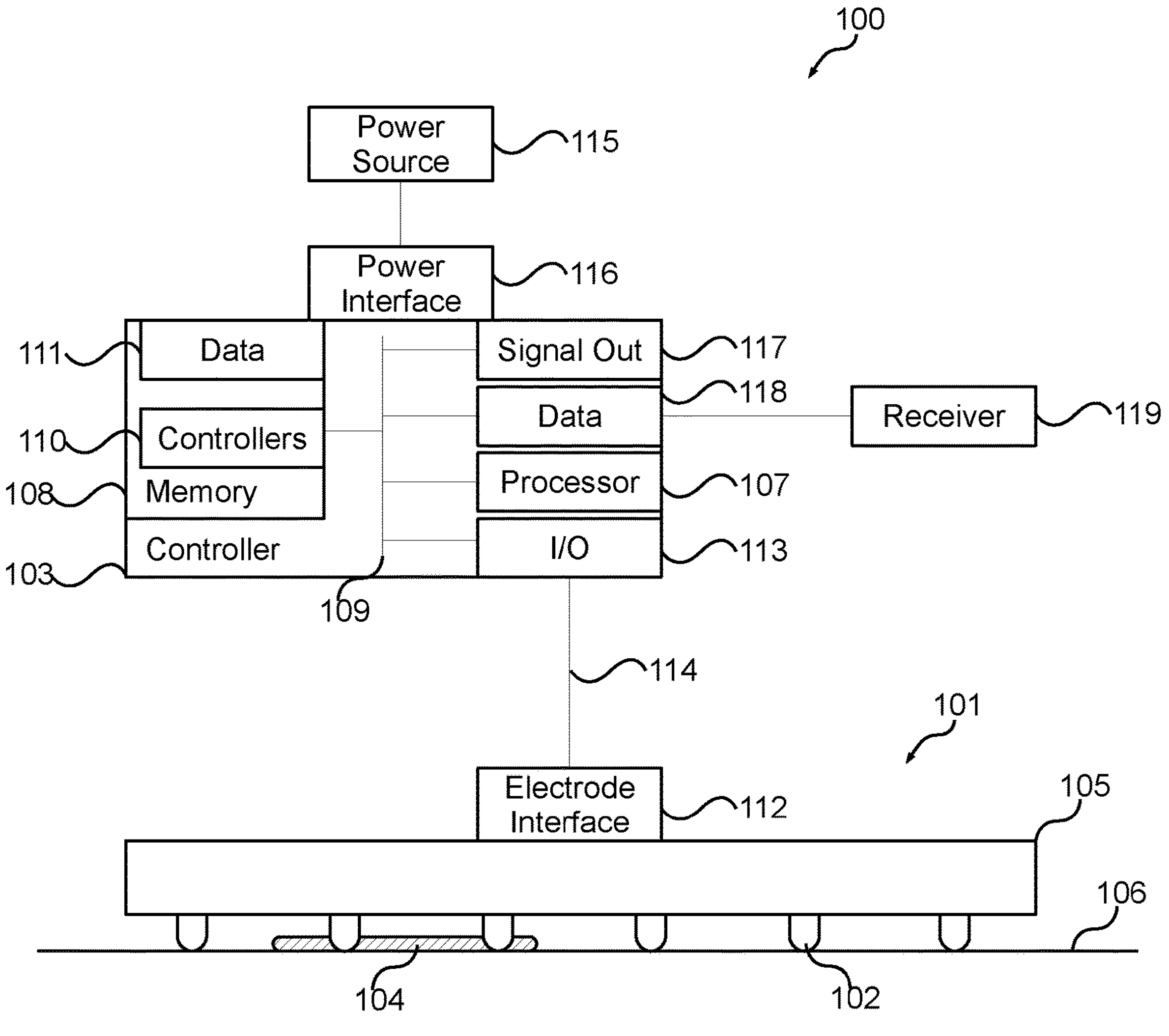
Power Source
Power Interface
Data
Controllers
Memory
Controller
Signal Out
Data
Processor
I/O
Receiver
Electrode Interface

LEAK DETECTION APPARATUS

FIELD OF THE INVENTION

This invention relates generally to leak detection apparatus. More particularly, this invention relates to leak detection apparatus comprising a detector installable within spaces surrounding wet areas for the automated detection of water leaks.

SUMMARY OF THE DISCLOSURE

There is provided herein leak detection apparatus comprising an installable detector comprising a plurality of spaced apart electrical electrodes. A controller operably interfaces the plurality of electrical electrodes. The controller is configured for detecting a leak by detecting current flow through water pooled between the electrodes.

The detector is installable within wall and void spaces surrounding wet areas such as bathroom baths, showers, cabinetry, kitchen and bathroom basins and the like. As such, the detector is able to detect a leak when a waterproof membrane is compromised, or movement and/or poor workmanship allows water to flow therethrough.

The detector may comprise a flexible body which may be elongate for installation in tight spaces and around corners and/or a mat for covering large areas such as under baths and which may be cut to size to fit.

The controller may operate a signal output or alternatively transmit data wirelessly to a receiver when detecting a leak.

According to one aspect, there is provided leak detection apparatus comprising an installable detector comprising a plurality of spaced apart electrical electrodes; and a controller operably interfacing the plurality of electrical electrodes, wherein the controller is configured for detecting a leak by detecting current flow through water pooled between the electrodes.

The detector may comprise a flexible body. The flexible body may comprise rubber.

The flexible body may be elongate such as longer than 30 cm and narrower than 2 cm.

The body may comprise the plurality of electrical electrodes therealong. The body may comprise electrical electrodes embedded therein. The electrical electrodes may be foil pieces adhered to surfaces of the body. The body may comprise a number of sides and wherein the electrodes may be located on each of the number of sides.

The flexible body may take the form of a rectangular mat. The mat may comprise a matrix of the electrodes. Adjacent electrodes of the matrix of the electrodes may be arranged approximately 1 cm apart or less.

The mat may comprise tear-off sections or sections that can be cut away to adjust the size of the mat without affecting the electrical conductivity of remaining electrodes.

The controller may comprise a signal output which may be activated when a leak is detected. The signal output may output an audio signal.

The apparatus may further comprise an electrode interface which applies voltage to alternative electrodes and which has current sensors operably coupled thereto to detect current flow.

The apparatus may further comprise an electrode interface interfacing the electrodes and wherein the electrode interface may be configured to differentiate between moisture and pooled water. The electrode interface may be configured to differentiate between moisture and pooled water by a current threshold. The controller may be configured for differentiating between moisture and pooled water according to signals from the electrode interface and wherein the controller may be configured for generating an alert accordingly. The threshold may be tunable.

The controller may be integrally formed with the body so that the detector can be installed as a single unit. Alternatively, the controller may be connected to the detector by electrical leads.

The controller may comprise an internal battery supply. The internal battery supply may have sufficient capacity to last more than one year. The controller may periodically wake from a sleep state to interrogate the electrodes.

The controller may comprise a data interface for wireless communication with a receiver.

The data interface may be a short-range wireless interface. The short-range wireless interface may be a Bluetooth interface or Wi-Fi interface.

In use, when detecting a leak, the controller may transmit an alert via the data interface to the receiver. In use, the receiver may interrogate the controller. The receiver may interrogate the controller to determine the operational status thereof or to determine whether a leak has been detected.

In use, the controller may detect a size of a leak depending on the number of electrodes exhibiting current flow.

The controller may categorise the type of leak depending on the number of electrodes exhibiting current flow. The controller may adjust an output signal depending on the number of electrodes exhibiting current flow.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a schematic of leak detection apparatus in accordance with an embodiment.

DESCRIPTION OF EMBODIMENTS

Leak detection apparatus 100 comprises an installable detector 101 comprising a plurality of spaced apart electrical electrodes 102.

The apparatus 100 further comprises a controller 103 operably interfacing the plurality of electrical electrodes 102. The controller 103 is configured for detecting a leak by detecting electrical conductivity caused by water 104 pooled between the electrodes 102.

The detector 101 may comprise a body 105 with the electrodes 102 on one side thereof. The detector 101 may be installed with the electrodes 102 against a wall or floor surface 106. In the example shown in FIG. 1, water 104 is pooled between the second and third electrodes 102 of the detector 101, thereby allowing a small electrical current to flow therebetween which is detected by the controller 103.

The controller 103 may comprise analogue circuitry. However, in the embodiment shown, the controller 103 is a digital controller.

In this regard, the controller 103 comprises a processor 107 for processing digital data. A memory device 108 operably interfaces the processor 107 across a system bus 109. The memory 108 is configured for storing digital data including computer program code instructions. The computer program code instructions may be logically divided into a plurality of computer program code instruction controllers 110. In use, the processor 107 fetches the computer program code instructions and associated data 111 from the memory 108 for interpretation and execution of the functionality described herein.

The controllers 111 may comprise an electrode interface controller which interprets readings from the electrodes 102 to detect a leak. In the embodiment shown, the detector 101 comprises an electrode interface 112 interfacing an I/O interface 113 of the controller 103.

The electrode interface 112 may apply voltage to alternate electrodes 102 and have current sensors operably coupled thereto which detects current flow.

The electrode interface 112 may be configured to detect current above a threshold so as to be able to distinguish between moisture buildup and pooled water. In embodiments, the controller 103 may be configured for distinguishing between moisture and pooled water so as to be able to provide separate respective alerts.

In embodiments, the threshold is tunable, including by way of a configurable setting within memory 108 of the controller 103.

The body 105 of the detector 101 may be especially configured for installation within tight wet area spaces.

The body 105 may be flexible, such as by comprising rubber, with the plurality of electrodes 102 embedded therein. Alternatively, the electrodes 102 may take the form of separate foil pieces printed or adhered to a surface of the body 105.

The body 105 is preferably elongate, such as 30 cm or more and less than 2 cm in width so as to be able to be installed in narrow gaps and around corners.

Whereas the electrodes 102 are shown as being on and undersurface of the body 105 in FIG. 1, in embodiments, the electrodes 102 may locate around all sides of the body 105 so that at least some of the electrodes 102 face downwardly to detect pooled water thereunderneath irrespective of the installation of the body 105.

In alternative embodiments, the body 105 takes the form of a flexible rectangular mat for laying across large areas, such as surfaces under a bath. In accordance with his embodiments, the mat may comprise a matrix of electrodes arranged approximately 1 cm apart or less. In embodiments, the mat may comprise tear-off sections or sections that can be cut away to adjust the size of the mat without affecting the electrical conductivity of the remaining electrodes.

The controller 103 may be integrally formed with the body so that the detector 101 may be installed as a single unit. However, in alternative embodiments, the controller 103 may be installed in an accessible area and connected to the detector 105 remotely by electrical leads.

The controller 103 may draw power from a power source 115. The power source 115 may be a general power outlet and a power interface 116 may comprise an AC to DC converter. The controller 103 may comprise an indicator (not shown) indicative of the supply of power to the controller 103.

In alternative embodiments, the controller 103 comprises an internal battery supply having sufficient capacity to last several years. The internal battery may comprise a lithium battery. To preserve power, the controller 103 may periodically wake from a sleep state to interrogate the electrodes 102, such as every hour.

The controller 103 may comprise a signal output 117 which is activated when the controller 103 detects a leak. The signal output 117 may output an audible cue to alert an owner of the detection of a leak.

In embodiments, the controller 103 comprises a data interface 118 for wireless communication with a receiver 119. The receiver 119 may take the form of a mobile communication device executing a software application thereon. The data interface 118 may be a short-range wireless interface such as a Bluetooth or Wi-Fi interface.

In use, when detecting a leak, the controller 103 may transmit an alert via the data interface 118 to the receiver 119. Alternatively, the receiver 119 may interrogate the controller 103 to interrogate the operational status thereof and/or to query whether a leak has been detected.

In use, the controller 103 may detect the size of a leak depending on the number of electrodes 102 exhibiting current flow. The controller 103 may categorise the type of leak depending on the number of electrodes exhibiting current flow wherein, for example, 2 electrodes may be classified as a minor leak, 2-6 may be considered as a medium leak and 6+ electrodes considered as a major leak.

In this regard, the controller 103 may adjust the signal output by the signal output 117 according to the classification of leak or the number of electrodes exhibiting current flow. Furthermore, the controller 103 may transmit an alert signal to the receiver 119 depending on the size of the leak detected.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A leak detection apparatus comprising:

an installable detector comprising a plurality of spaced apart electrical electrodes;

a controller operably interfacing the plurality of electrical electrodes, wherein the controller is configured for detecting a leak by detecting current flow through water pooled between the electrodes; and an electrode interface interfacing the plurality of electrodes, wherein:

the leak is characterized as moisture or pooled water;

the electrode interface differentiates between the moisture and the pooled water based on a tuneable current threshold; and the controller differentiates between the moisture and the pooled water so as to provide separate alerts for the pooled water and the moisture.

2. The apparatus as claimed in claim 1, wherein the detector comprises a flexible body.

3. The apparatus as claimed in claim 2, wherein the flexible body comprises rubber.

4. The apparatus as claimed in claim 2, wherein the flexible body is elongate.

5. The apparatus as claimed in claim 4, wherein the body is longer than 30 cm.

6. The apparatus as claimed in claim 4, wherein the body has a width that is narrower than 2 cm.

7. The apparatus as claimed in claim 4, wherein the body comprises the plurality of electrical electrodes therealong.

8. The apparatus as claimed in claim 7, wherein the body comprises electrical electrodes embedded therein.

9. The apparatus as claimed in claim 7, wherein the electrical electrodes are foil pieces adhered to surfaces of the body.

10. The apparatus as claimed in claim 4, wherein the body comprises a number of sides and wherein the electrodes are located on each of the number of sides.

11. The apparatus as claimed in claim 1, wherein the flexible body takes the form of a rectangular mat.

12. The apparatus as claimed in claim 11, wherein the mat comprises a matrix of the electrodes.

13. The apparatus as claimed in claim 12, wherein adjacent electrodes of the matrix of the electrodes are arranged approximately 1 cm apart or less.

14. The apparatus as claimed in claim 12, wherein the mat comprises tear-off sections or sections that can be cut away to adjust the size of the mat without affecting the electrical conductivity of remaining electrodes.

15. The apparatus as claimed in claim 1, wherein the controller comprises a signal output which is activated when a leak is detected.

16. The apparatus as claimed in claim 15, wherein the signal output outputs an audio signal.

17. The apparatus as claimed in claim 1, further comprising an electrode interface which applies voltage to alternative electrodes and which has current sensors operably coupled thereto to detect current flow.

18. The apparatus as claimed in claim 1, wherein the controller is integrally formed with the body so that the detector can be installed as a single unit.

19. The apparatus as claimed in claim 1, wherein the controller is connected to the detector by electrical leads.

20. The apparatus as claimed in claim 1, wherein the controller comprises an internal battery supply.

21. The apparatus as claimed in claim 20, wherein the internal battery supply has sufficient capacity to last more than one year.

22. The apparatus as claimed in claim 20, wherein the controller periodically wakes from a sleep state to interrogate the electrodes.

23. The apparatus as claimed in claim 1, wherein the controller comprises a data interface for wireless communication with a receiver.

24. The apparatus as claimed in claim 23, wherein the data interface is a short-range wireless interface.

25. The apparatus as claimed in claim 24, wherein the short-range wireless interface is a Bluetooth interface.

26. The apparatus as claimed in claim 24, wherein the short-range wireless interface is a Wi-Fi interface.

27. The apparatus as claimed in claim 23, wherein, in use, when detecting a leak, the controller transmits an alert via the data interface to the receiver.

28. The apparatus as claimed in claim 23, wherein, in use, the receiver interrogates the controller.

29. The apparatus as claimed in claim 28, wherein the receiver interrogates the controller to determine the operational status thereof.

30. The apparatus as claimed in claim 28, wherein the receiver interrogates the controller to determine whether a leak has been detected.

31. The apparatus as claimed in claim 1, wherein, in use, the controller detects a size of a leak depending on the number of electrodes exhibiting current flow.

32. The apparatus as claimed in claim 31, wherein the controller categorises the type of leak depending on the number of electrodes exhibiting current flow.

33. The apparatus as claimed in claim 31, wherein the controller adjusts an output signal depending on the number of electrodes exhibiting current flow.

* * * * *